UNITED STATES PATENT OFFICE.

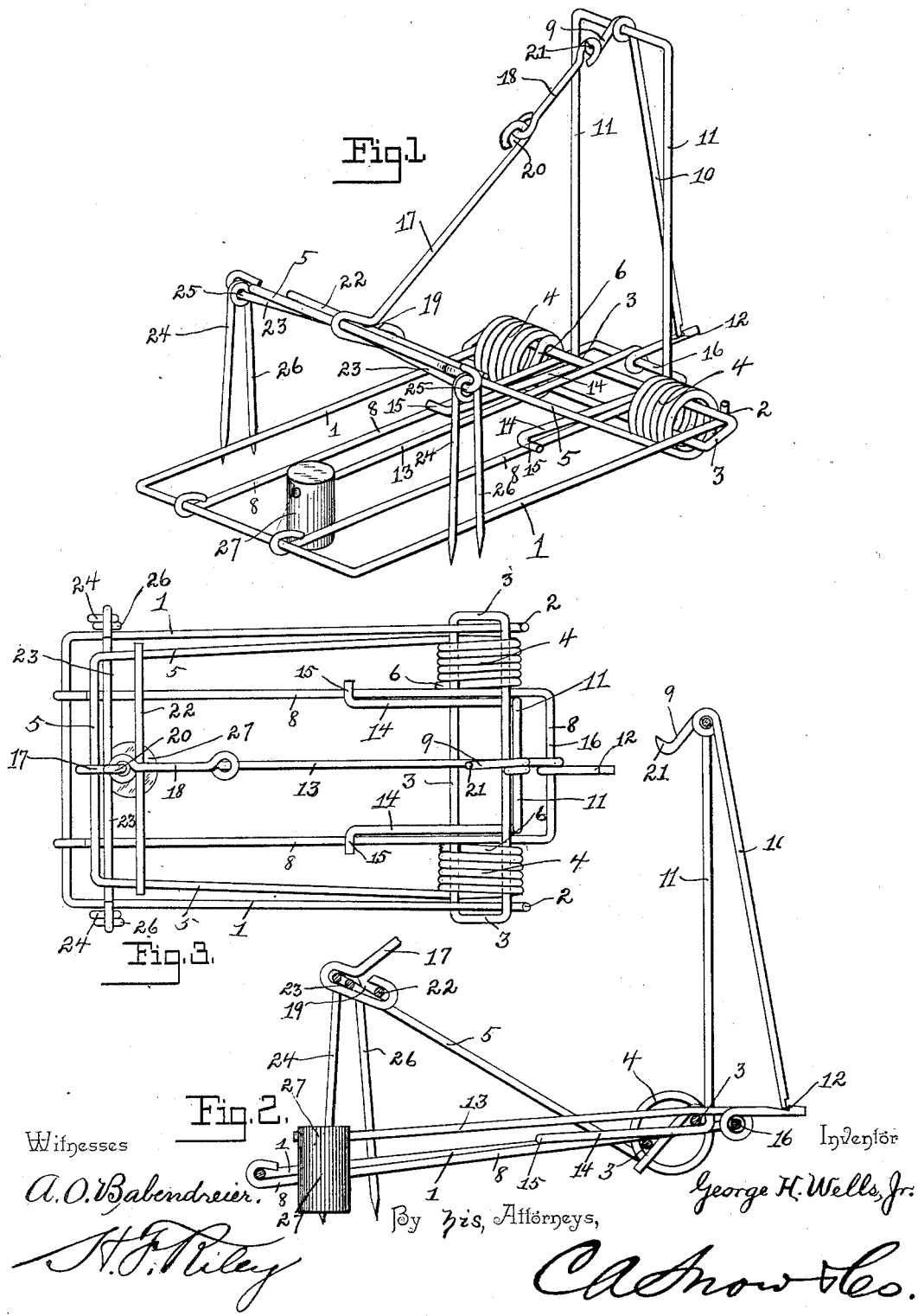

GEORGE HENRY WELLS, JR., OF LAKE CHARLES, LOUISIANA, ASSIGNOR OF ONE-HALF TO SOLOMON BLOCH, OF SAME PLACE.

MOLE-TRAP.

SPECIFICATION forming part of Letters Patent No. 462,342, dated November 3, 1891.

Application filed June 3, 1891. Serial No. 394,943. (No model.)

*To all whom it may concern:*

Be it known that I, GEORGE HENRY WELLS, Jr., a citizen of the United States, residing at Lake Charles, in the parish of Calcasieu, and State of Louisiana, have invented a new and useful Mole-Trap, of which the following is a specification.

The invention relates to improvements in mole-traps.

The object of the present invention is to simplify and improve the construction of mole and similar burrowing animal traps, and to render the operation more positive and reliable.

The invention consists in the construction and novel combination and arrangement of parts hereinafter fully described, illustrated in the accompanying drawings, and pointed out in the claims hereto appended.

In the drawings, Figure 1 is a perspective view of a mole-trap embodying the invention. Fig. 2 is a vertical longitudinal sectional view. Fig. 3 is a plan view, the trap being sprung.

Referring to the accompanying drawings, 1 designates a wire base approximately U-shaped and provided at its ends with eyes 2 or bends, in which is secured one side of a rear brace 3, which is transversely disposed and is constructed of wire and is approximately rectangular, and is arranged at the back of the trap and supports coils 4 of a spring-actuated striking-wire 5. The striking-wire is U-shaped and conforms to the configuration of the base 1, and is arranged within the same when the trap is sprung, and has its sides and front parallel with those of the base, and is provided at its ends with the coils 4. The coils 4 extend inward from the sides of the striking-wire, and are arranged on the parallel sides of the rear transverse brace 3 between the sides of the base and the sides of a longitudinal brace, and their inner ends 6 pass between the sides of the brace and engage the same and prevent the coils turning when the striking-wire is raised to set the trap. The coils, by being arranged between the sides of the base and the sides of the longitudinal brace 8, are prevented from spreading and losing their strength.

The striking-wire is held above the base when the trap is set by an arm 9 of a trigger-wire 10, which is provided at its angle with an eye and is mounted on a trigger-frame 11, and has its lower end recessed and adapted to engage a shoulder 12 at the rear end of a trigger 13.

The trigger-frame 11 is U-shaped, and is provided at the lower ends of its sides with L-shaped extensions 14, which are arranged at an angle to the sides of the trigger-frame 11, and when the trap is set the lateral portions 15 bear upon the sides of the longitudinal brace 8. The trigger-frame is mounted on the transverse brace 3 and receives the rear side of the same in its angle, and the L-shaped portions pass through the sides of the transverse brace 3.

The longitudinal brace is U-shaped and is constructed of wire and has its ends provided with eyes, which engage the front of the base 1, and the longitudinal brace extends rearwardly and passes through the sides of the transverse brace 3 and has its cross-piece 16 arranged back of the brace 3 and forming a pivot for the trigger 13.

The striking-wire frame is connected with the trigger-wire when the trap is set by a rod 17 and a link-rod 18, the former of which is provided at one end with a loop 19 and at the other end with an eye 20, which engages an eye of the link-rod 18, and the latter is provided at both ends with eyes. The link-rod 18 has one end engaging the eye of the rod 17, and its other end is adapted to engage a projection 21 of the arm 9 of the trigger-wire 10. The rod 17 is attached to the front or outer end of the striking-frame and receives the cross-piece of the same within its loop 19, which extends longitudinally of the striking-frame and also receives a transverse securing-rod 22 and a similarly-disposed impaler-rod 23. The impaler-rod is arranged on the lower face of the striking-frame, and the inner end of the loop 19 is sprung up above the striking-frame and is secured by the rod 22, which engages the loop 19 and the upper face of the striking-frame, and the spring of the metal of the loop forces the securing-rod against the striking-frame and holds the rod 17 rigid therewith.

The ends of the impaler-wire are extended beyond the sides of the base and are bent upon themselves to secure impalers 24. The impalers are each constructed of a single piece of wire, which is doubled and bent to form an eye 25 and sides 26. The eye receives the ends of the impaler-wire, and the ends of the sides 26 are pointed and are adapted to pass through the body of a mole or similar animal.

The trap is set by engaging the link-rod with the projection of the trigger-wire and engaging the latter with the rear end of the trigger, and the front end of the latter is attached to a post 27, which is placed in a mole-run in position so that it will be touched and lifted by a mole in passing through the run. By raising the front end of the trigger the rear end is depressed, which releases the trigger-wire and springs the trap and causes the impalers to strike the animal.

It will be seen that the trap is simple and inexpensive in construction, strong and durable, and positive and reliable in operation.

The frame of the trap herein shown and described is constructed similar to that shown in another application filed by me this day, and disclosing a trap especially designed for rats and similar animals.

What I claim is—

1. An animal-trap comprising the base-wire, the transverse brace, the longitudinal brace, the trigger-frame secured to the transverse brace, the U-shaped striking-frame provided at its ends with coils arranged on the transverse brace, the trigger-wire mounted on the trigger-frame, the trigger having its rear end arranged to be engaged by the trigger-wire and provided at its front end with a depending post, the wire 17, rigidly secured to the outer end of the striking-wire, the link-rod connected to the rod 17 and adapted to engage the trigger-wire, and the impalers connected with the striking-frame, substantially as described.

2. An animal-trap comprising the base-wire, the transverse brace, the trigger-frame mounted on the transverse brace, the U-shaped striking-frame provided at its ends with coils arranged on the transverse brace, the trigger-wire mounted on the trigger-frame, the trigger provided at its front end with a depending post, the rod 17, provided with a loop 19, receiving the striking-frame, the impaler-rod passing through the loop and arranged beneath the striking-frame, the securing-rod engaging the loop and the upper face of the striking-frame and rigidly securing the rod 17, the link-rod attached to the rod 17 and adapted to engage the trigger-wire and the impalers, substantially as described.

3. An animal-trap comprising the base-wire, the transverse brace, the longitudinal brace, the trigger-frame provided at its ends with L-shaped extensions arranged at an angle and passing through the sides of the transverse brace and having their lateral portions engaging the longitudinal brace, the trigger, the U-shaped striking-frame provided at its ends with coils arranged on the transverse brace, the rod 17, provided with a loop 19, the securing-rod, the impaler-rod extending beyond the sides of the trap and having its ends bent on themselves, and the impalers each constructed of a piece of wire doubled and bent to form eyes and sides, substantially as described.

In testimony that I claim the foregoing as my own I have hereto affixed my signature in presence of two witnesses.

GEORGE HENRY WELLS, Jr.

Witnesses:
  E. G. SIGGERS,
  J. H. SIGGERS.